United States Patent
Karlsson et al.

(10) Patent No.: US 10,313,710 B1
(45) Date of Patent: Jun. 4, 2019

(54) SYNCHRONIZING ENCODING BETWEEN ENCODERS

(71) Applicant: Amazon Technologies, Inc., Seattle, WA (US)

(72) Inventors: Kent Haakan Karlsson, Issaquah, WA (US); Gaurav Saxena, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/664,246

(22) Filed: Jul. 31, 2017

(51) Int. Cl.
  *H04N 7/173* (2011.01)
  *H04N 21/234* (2011.01)
  *H04N 21/8547* (2011.01)
  *H04N 21/6379* (2011.01)
  *H04N 21/2187* (2011.01)

(52) U.S. Cl.
  CPC ....... *H04N 21/234* (2013.01); *H04N 21/2187* (2013.01); *H04N 21/6379* (2013.01); *H04N 21/8547* (2013.01)

(58) Field of Classification Search
  CPC .......................... H04N 21/235; H04N 21/435
  See application file for complete search history.

(56) References Cited

U.S. PATENT DOCUMENTS

| | | | |
|---|---|---|---|
| 2009/0304082 A1* | 12/2009 | Radhakrishnan | G06F 17/30787 375/240.15 |
| 2012/0128061 A1* | 5/2012 | Labrozzi | H04N 21/234354 375/240.02 |
| 2014/0115626 A1* | 4/2014 | Sarda | H04N 21/44016 725/34 |

* cited by examiner

*Primary Examiner* — Gigi L Dubasky
(74) *Attorney, Agent, or Firm* — Weaver Austin Villeneuve & Sampson LLP

(57) ABSTRACT

Techniques are described for synchronizing encoding processes between encoders. Timestamps are compared between encoders such that offsets can be determined and used by encoders to encode fragments for the same segments of media content.

21 Claims, 3 Drawing Sheets

US 10,313,710 B1

SYNCHRONIZING ENCODING BETWEEN ENCODERS

BACKGROUND

Live media content includes channels or feeds with scheduled content (e.g., premium movie channels) as well as live broadcasts (e.g., sporting events, news, etc.). Unlike video-on-demand (VOD) content, live content may not have a distinct end point and may continue indefinitely. In addition, VOD content may be buffered or otherwise stored in client devices well in advance of the client playhead (i.e., the content fragment currently being rendered by the client). This is typically not the case for live content because of the fact that the delay between the live playhead (i.e., the latest content fragment available) and the client playhead may be only a few seconds, as well as the fact that the live content is often generated in real time and therefore may not yet exist.

An origin stack is the set of transcoding, digital rights management (DRM), and media processing hardware and software resources to generate encoded content for delivery to client devices. Multiple encoders may be configured to encode the same content for redundancy and load balancing purposes. If one of the encoders becomes unreliable, all of the streaming sessions receiving fragments encoded by that encoder need to start receiving fragments encoded by a different encoder. Typically, source media content is received at an origin stack without a time reference and at different times at different encoders operating in parallel. This can result in playback interruptions on a client device as a media server transitions the client from fragments encoded by one encoder to fragments encoded by another.

DETAILED DESCRIPTION

This disclosure describes techniques for encoding fragments for identical, or substantially similar, segments of live media content across multiple encoders. Several encoders are provisioned in parallel to provide encoded versions of the same live media content for streaming to client devices. Because encoders are spread throughout a geographic region, live media content for a particular channel may reach different encoders at different times. To account for different arrival times between encoders, offsets from a source time (e.g., network time protocol) are determined and fragments are aligned across encoders using these offsets. Using this approach, each encoder creates fragments that correspond to the same segments of media content, allowing client devices to receive fragments encoded at different origin stacks. An example may be instructive.

Figure 1:
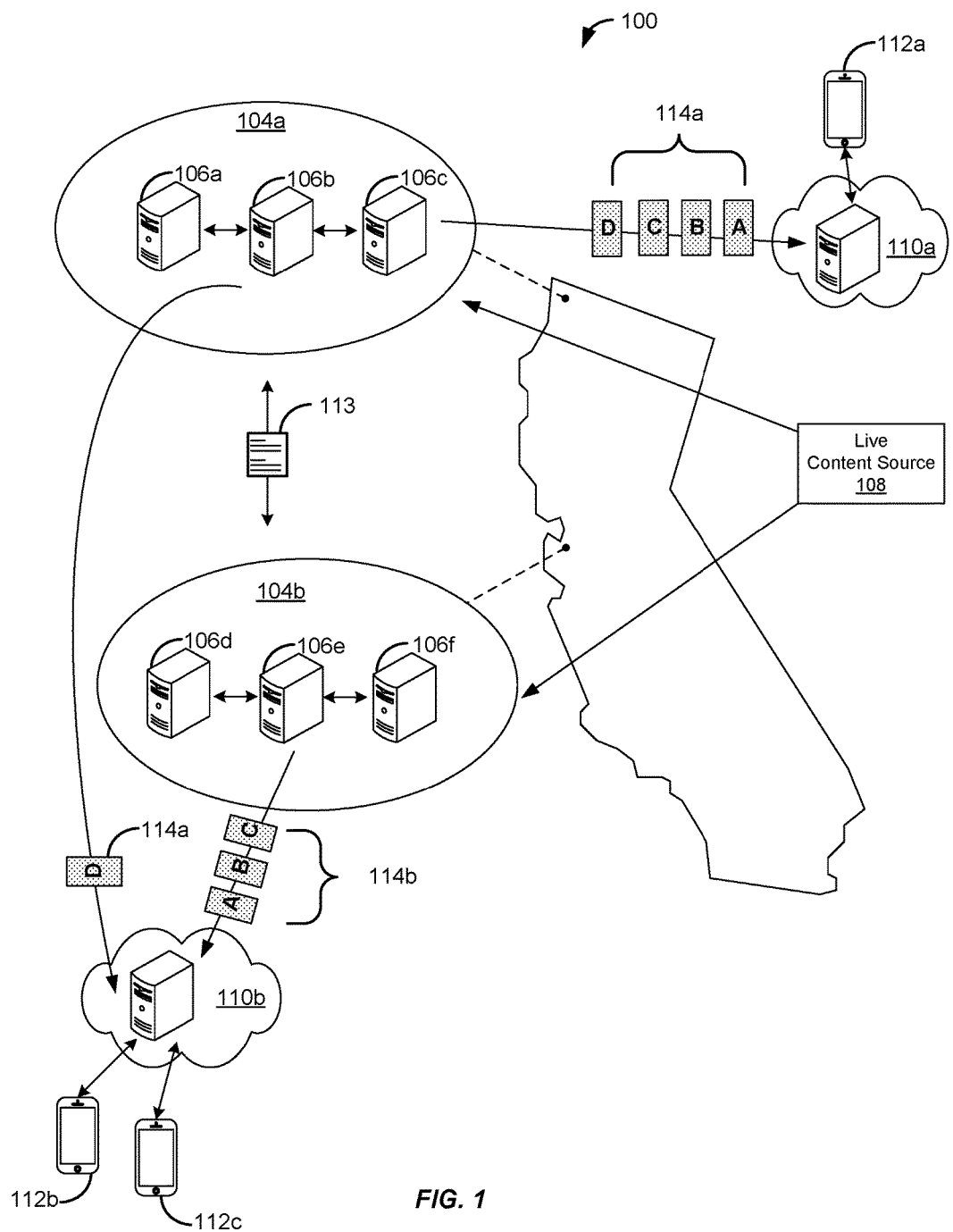
FIG. 1 illustrates an example of a system for encoding of fragments according to a particular implementation.

FIG. 1 shows a distributed content delivery service 100 that includes origin stacks 104a and 104b located in California. Origin stacks may be regional or deployed worldwide. Origin servers 106a-106f receive feeds of media content from live media source 108, encode the media content using encoders, and provide encoded media content to edge servers 110a and 110b for delivery to client devices 112a-112c. Live content source 108 includes media content transmitted through a variety of mediums (e.g., satellite, digital transmission, etc.). As show in FIG. 1, origin stacks 104a and 104b are receiving live media content from source 108. When origin stack 104a receives a feed of live media content from live source 108, origin stack 104a provisions origin server 106c to encode the feed. A similar process occurs at other geographically separated origin stacks, for instance, origin stack 104b provisions origin server 106e to encode another feed for the same live content being received by origin server 106c. In this example, origin server 106c is receiving the live media content approximately one second before origin server 106e.

As origin server 106b starts the process of encoding the first fragment of the live media content, instead of encoding the fragment immediately, origin server 106b generates fingerprints (a block of averaged pixel values at a designated location in a frame) of the media content. Origin server 106b will generate fingerprints that are sufficiently unique (e.g., three fingerprints across three distinct frames of media content) to compare between different feeds of the live media content. Each fingerprint includes a timestamp representing when the portion of media content was received at origin server 106b. A synchronization pattern including the fingerprints and timestamps is generated by origin server 106b and sent to any of the other origin servers that are also encoding the live media content. In this example, origin server 106b is the first server to receive the feed of live media content. After sending out the synchronization pattern, origin server 106b sets the encoding offset to a default value (or the source time of the portions arrival) because there are no other encoders currently encoding the live media content. Origin server 106b then begins encoding fragments 114a of the live content, sending fragments 114a to edge server 110a for delivery to client device 112a.

As mentioned above, origin server 106e is receiving a feed from live source 108 approximately one second after origin server 106b. Similar to origin server 106b, instead of encoding the fragment immediately, origin server 106b generates fingerprints for an initial portion of live media content it has received. Origin server 106b generates synchronization pattern 113 and sends it to origin server 106b. Upon receiving synchronization pattern 113, origin server 106b identifies a corresponding portion of the feed of live media content using synchronization pattern 113. After identifying the corresponding portion, origin server 106b identifies a timestamp associated with the time origin server 106b received the portion of media content corresponding to the synchronization pattern 113. Origin server 106b then sends the timestamp to origin server 106e. Origin server 106e compares the timestamp received from origin server 106b to the timestamp of when origin server 106e received the same portion of live media content.

Origin server 106e determines that there is approximately a one second difference between when it received the live media content and when origin server 106b received the live media content. As such, origin server 106e sets its encoding offset to one second and starts encoding fragments 114b corresponding to the same segments (e.g., the same four seconds of content from live source 108) of live media content using the one second offset to create the initial key frame of each fragment. Because the fragments from origin servers 106b and 106 are being encoded for the same segment of media content, client devices 112a-112c can receive fragments from either origin server without disruption to the playback experience. For example, if the performance of origin server 106e becomes unreliable after sending edge server 110*b* fragments A, B, and C of fragments 114*b*, then edge server 110*b* requests the next fragment, fragment D of fragments 114*a*, for delivery to client device 112*b*. Client device 112*b* can then playback fragment D and any other subsequent fragments from origin server 106*b* without interruption.

Figure 2:
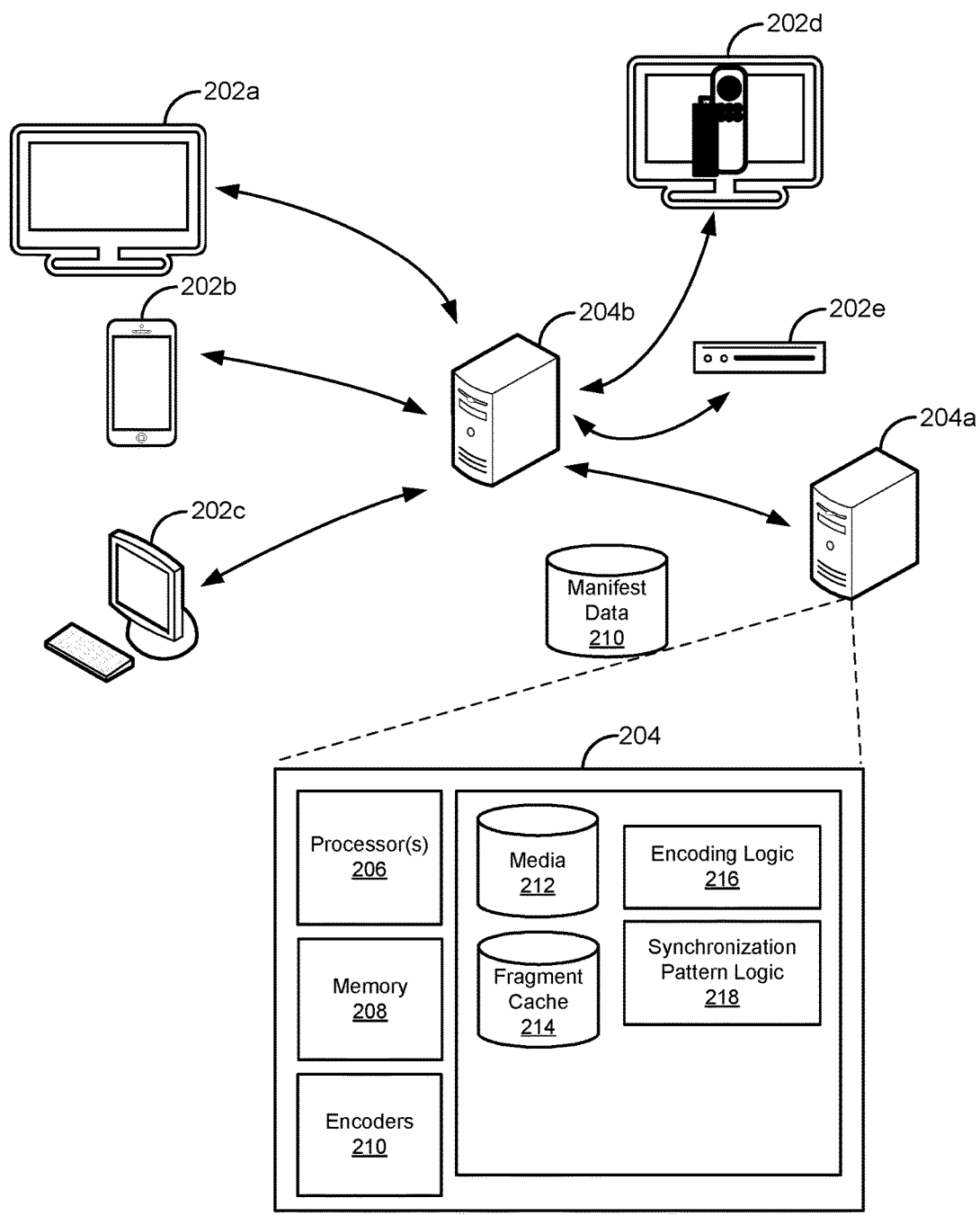
FIG. 2 is a simplified diagram of a computing environment in which various implementations may be practiced.

FIG. 2 illustrates an example of a computing environment for encoding and delivering media content. The computing environment of FIG. 2 includes origin server 204*a* that encodes and provides fragments to edge server 204*b*. Origin server 204*a* receives source media content (e.g., a feed of live media content) to encode fragments of media content. Edge server 204*b* provides manifests and encoded fragments to client devices 202*a*-*e*. Client devices 202*a*-*e* decode the encoded media content for playback on a display screen.

Edge server 204*b* and/or origin server 204*a* may be part of a content delivery system that conforms to any of a wide variety of architectures. The functionality and components of edge server 204*b* and/or origin server 204*a* can be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein may be implemented by one or more of different entities. For example, the functionality to generate a manifest can be handled by a separate server such as a manifest server. In another example, the functionality to provide playback of media content might be integrated into a video player or software client under control of one entity (e.g., on client devices 202*a*-*e*), integrated into a separate app from another entity, implemented in an edge server or content server of a CDN, a server of an ISP, etc.

In FIG. 2, client device 202*a* is a smart TV, client device 202*b* is a smartphone device, client device 202*c* is a desktop computer, client device 202*d* is a TV and media player stick (e.g., Amazon Fire TV Stick®), and client device 202*e* is a set-top box. In addition, related functionality may also be implemented within tablets, wearable devices, virtual or augmented reality headsets, video game consoles, etc.

Servers 204*a* and 204*b* might conform to any of a wide variety of architectures, and its functionality may be implemented by a variety of physical servers and/or virtual servers. In some implementations, edge server 204*b* is partitioned to have separate virtual servers configured to perform different functions. In one example, one virtual server could generate manifests, and a second virtual server might provide generated manifests and fragments to client devices 202*a*-*e*. In another example, several virtual servers are configured to deliver fragments to each respective client devices 202*a*-*e*. Edge server 204*b* can include various types of logic including playback handling logic to provide proper playback of fragments and playback metadata to client devices 202*a*-*e* and manifest generation logic that identifies manifest data for media content such that client devices 202*a*-*e* can properly request and decode fragments from edge server 204*b*.

Origin server 204*a* includes one or more processor circuits 206, memory 208, and other hardware components to encode media content and provide the encoded media content to client devices 202*a*-*e*. For example, processor circuits 206 execute stored instructions in memory 208 of origin server 204*a* to implement encoding techniques disclosed herein. It should be noted that, while processor circuits 206, memory 208, encoders 210, media database 212, fragment cache database 214, encoding logic 216, and synchronization pattern logic 218 (described below) are contemplated as integrated with origin server 204*a*, implementations are contemplated in which some or all of their respective functionality is implemented independently of a single origin server 204*a*. It should also be noted that processor circuits 206, logic 216 and 218, or both processor circuits 206 and execute logic 216 and 218 can be implemented using special purpose circuitry, e.g., a field programmable gate array or an application specific integrated circuit.

Encoders 210 can be implemented using or both software and hardware components. In some implementations, an encoder is configured to use aspects of logic 216 and 218. For example, encoders 210 may encoding parameters and/or offsets stored in memory 208 to encode fragments of media content at various bitrates. Encoders 210 can use a variety of variable bitrate encoding techniques, for instance, single-pass encoding, multi-pass encoding, constrained variable bitrate encoding, content type variable bitrate encoding, and any other lossless and/or lossy encoding technique that meets an encoding standard, e.g. High Efficiency Video Coding (HEVC/H.265). This and other examples described herein assume the use of H.265 encoding for live media content. However, it will be understood that the basic principles described herein may be employed with any of a variety of video and audio codecs and streaming technologies including, for example, Dynamic Adaptive Streaming over HTTP (MPEG-DASH), HTTP Dynamic Streaming, HTTP Live Streaming (HLS), Smooth Streaming, H.264, MPEG-1, MPEG-2, MPEG-4 Part 2, VC-1, H.263, VP8, VP9, JPEG 2000, and Daala. Origin server 204*a* can also include a multiplexer for balancing encoding processes between encoders 210 such that computing resources are managed efficiently for variable bitrate encoding processes, e.g., allocating more computing resources for fragments being encoded at higher bitrates and allocating less computing resources for fragments being encoded at lower bitrates.

In FIG. 2, origin server 204*a* includes various types of logic to synchronize fragment creation among different encoders and to provide fragments to edge server 204*b*. For example, origin server 204*a* includes encoding logic 216 to encode a variety of fragments at different qualities and bitrates, which are sent to edger server 204*b* for delivery to client devices 202*a*-*e*. The functionalities of synchronization pattern logic 218 include identification of fingerprints and communication techniques (e.g., a publish-subscribe model, gossip protocols, direct messaging, etc.) for the transmission of synchronization patterns among other origin servers. Fingerprint data can be grouped and stored together to define a synchronization pattern. Synchronization patterns can be stored and correlated with specific portions of different live media content. Origin server 204*a* can also store additional data, such as the start times and end times of each fingerprint and/or synchronization pattern. After generating a synchronization pattern, the synchronization pattern is stored in memory such as a local buffer and/or cache before being sent to other encoders.

Client devices 202*a*-*e* can also include various types of logic, for instance, decoder logic for decoding the encoded media content received from edge server 204*b* and playback handling logic to request playback of portions of media content. In addition, client devices 202a-e includes various types of memory to store and/or cache decoded media, one or more processors, and other hardware components to request and decode the encoded media content provided by edge server 204b. For example, the processors of client devices 202a-e execute stored instructions in memory to implement decoding techniques based on the encoding techniques disclosed herein. Client devices 202a-e use manifests to identify fragments of media content and request playback using a variety of adaptive bitrate streaming techniques. In addition, client devices 202a-e may communicate with edge server 204b through different types of network protocols such as a stateful connection, e.g., a physical socket connection between server and client. Examples of stateful network protocols include Real-Time Messaging Protocol (RTMP), Real-Time Messaging Protocol Encrypted (RT-MPE), Multimedia Messaging Service (MMS), etc. In another example, client devices 202a-e communicate with edge server 204b using a stateless connection, for instance, using the Hypertext Transfer Protocol (HTTP) along with manifests to deliver media content. Client devices use manifests to identify fragments of media content and request playback of them at a reliable bitrate using adaptive bitrate streaming.

It should be noted that, despite references to particular computing paradigms and software tools herein, the computer program product and the computer program instructions on which various implementations disclosed herein are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Figure 3:
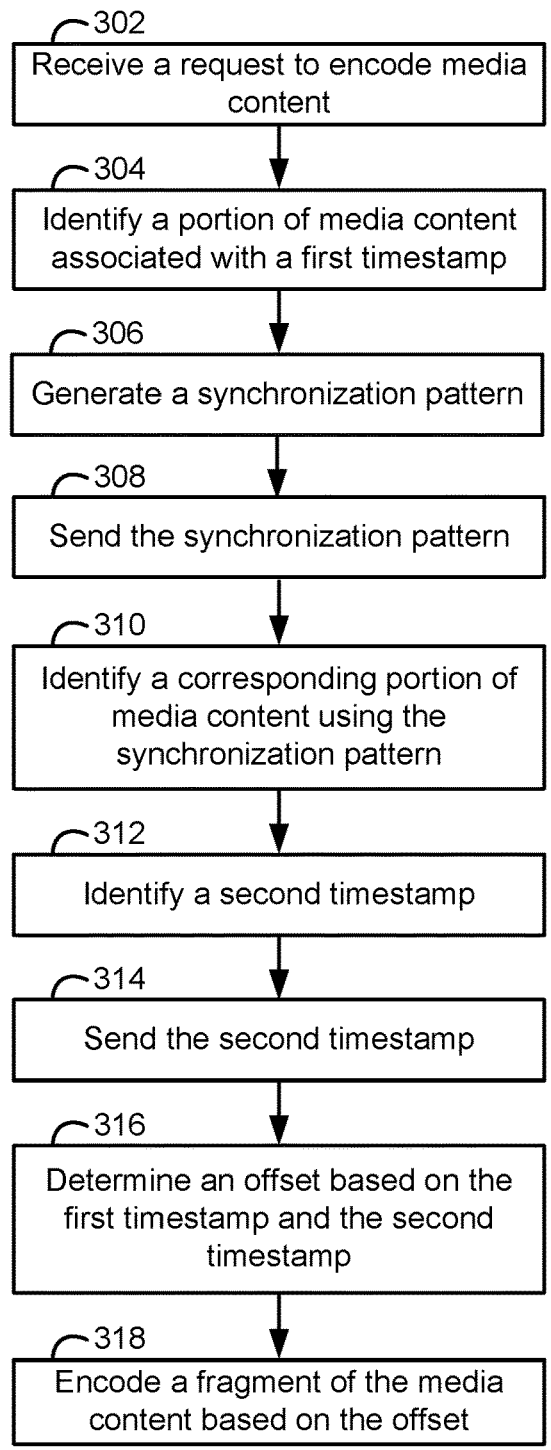
FIG. 3 is a flowchart illustrating operation of a particular implementation.

The encoding of media content according to a particular implementation is illustrated in the flow chart of FIG. 3. An origin server (e.g., origin server 106e) selects different encoders to encode a variety of live media content. After an origin server selects an encoder, the origin server provisions the encoder to receive the live media content (302). Live media content is received by an encoder from a variety of mediums and content sources (e.g., a satellite source or a digital feed, etc.). As media content is received for encoding, the encoder assigns timestamps to portions of the received media content, which are later used to align fragments (fragments generated by different encoders are of the same duration, so a properly offset initial key frames results in fragments being created for the same segments of media content across encoders). In one example, an encoder processes portions of media content and assigns a timestamp according to a source time such as the network time protocol (NTP). Alternatively, another universal source of time synchronization (e.g., HTTP time protocol, network time protocol, etc.) could be used, and a variety of other suitable techniques for assigning timestamps to portions of media content that are known or within the capabilities of those skilled in the art could also be used.

Returning to FIG. 3, an encoder identifies and generates fingerprints for a portion of the incoming media content (304). The size and block configuration of a fingerprint may vary (e.g., 8×8 blocks, 16×16 blocks, 32×32 blocks, 64×64 blocks). Pixel intensity values are one example of a measurement that can be used to generate a fingerprint. A pixel intensity value associated with a block of pixels can be determined by averaging the pixel values of each pixel of the block of pixels. For example, a location that captures an 8×8 block of black pixels will not provide sufficiently unique pixel values for a useful fingerprint, whereas a location that captures an 8×8 block of non-uniform pixel values will result in an average pixel value that can be matched reliably and accurately. As an illustration, an 8×8 pixel block in the middle of a frame captures pixel values across five frames of incoming media content. An average color value is calculated among the pixels in each of the five frames (e.g., using RGB values [255, 255, 255]; [255, 240, 0]; [242, 49, 242]; [101, 101, 191]; [110, 253, 253]), resulting in values that are distinct and suitable for matching purposes (discussed further below). In another example, a video fingerprint might be derived by identifying scene changes in the content (e.g., by comparing changes in successive frames or detecting black frames), with the fingerprint representing the timing of the changes over one or more ranges of the content. Moreover, any other fingerprinting techniques may be used to generate a fingerprint, including average gray level color intensity comparison, pairwise intensity comparison, or any other technique known to those skilled in the art.

In other implementations, fingerprints may be generated from audio content. For example, hash values may be calculated using audio samples associated with spectrogram peaks, resulting in a constellation of temporally localized data points. A variety of other suitable techniques are known or within the capabilities of those skilled in the art.

After identifying a sufficient number of fingerprints (discussed above), a synchronization pattern is generated (306). In some implementations, a synchronization pattern is a distinct data structure containing the fingerprints. In other implementations, the synchronization pattern is a collection/set of fingerprints, both of which can be sent to other encoders for further processing. In some implementations, multiple synchronization patterns are generated and sent as part of initializing fragment alignment. For example, a first synchronization pattern may be sent based on a first set of fingerprints followed by another synchronization pattern based on a second set of fingerprints 10 seconds later. This allows the encoder to verify and refine an offset to be used to for aligning fragment creation.

In some cases, as time passes encoders can drift out of alignment for a variety of reasons (e.g., computing resource changes, changes in the medium of distribution, general traffic changes throughout the internet, etc.). In order to avoid drift between a group of encoders, synchronization patterns may be generated periodically (e.g., every 5, 10, 15 minutes) by encoders to ensure that the offset for an encoder has not drifted from the other encoders. The amount of drift can vary from a few milliseconds to a few seconds. To illustrate, after initializing fragment alignment, a first encoder sends out a synchronization pattern to a group of other encoders. Upon receiving an indication that an encoder has drifted 100 milliseconds from one of the other encoders in the group (e.g., based on conflicting timestamps), a new offset is determined (discussed further below). In other cases, if several encoders provide indications of significant drift, e.g., three seconds, then the encoders might need to restart the process of aligning fragment creation across the group.

Upon generating the synchronization pattern, an encoder sends the synchronization pattern to other encoders encoding the live media stream (308). However, in some cases, an encoder is the first encoder of a group to start encoding fragments for live media content. In this case, the encoder, instead of sending a synchronization pattern to other encoders, the encoder can provide an indication to the other encoders that it is the primary encoder on which the other encoders should base their offset determination.

A variety of messaging techniques can be used for encoders to communicate synchronization patterns between each other. In one implementation, a publish-subscribe model is used to facilitate synchronization pattern communication between encoders. For example, a new source of live media content is to be provisioned among a group of encoders, an intermediary component (e.g., a broker component) is configured to handle events related to the new live content. Each of the encoders subscribes to the intermediary component such that they will receive any new synchronization patterns that are published. In this way, each encoder does not need to know the location of the other encoders, only the location of the intermediary component.

In other implementations, gossip protocols are used to facilitate communication of synchronization patterns. Gossip protocols can be used to allow for periodic, pairwi se, inter-process updates regarding synchronization patterns. For example, one encoder might only have information concerning synchronization patterns from encoders that are closest to it in geographic proximity; however, as each encoder across a geographic area exchanges synchronization patterns with the closest encoders to them, it is possible for synchronization patterns to pass between geographically distant encoders. Examples of suitable gossip protocols will be identifiable by those of skill in the art. In addition, encoders may also communicate between each through a variety of synchronous and asynchronous direct messaging protocols. Reference to particular protocols herein are merely by way of example. Suitable alternatives known to those of skill in the art may be employed.

Returning to FIG. 3, each encoder in the group of encoders identifies a corresponding portion of the live media content (e.g., an identical or substantially similar portion of the live media content) using a synchronization pattern provided by the encoder of block 308 (310). A variety of matching techniques may be used by the encoder group, for instance, fuzzy matching techniques applied with confidence thresholds. Depending on the application, a corresponding portion of the live media content may be identified by many encoders. Alternatively, only a single encoder might be used to identify a corresponding portion of media content. In some implementations, a matching portion of media content is found where the confidence level associated with a similarity measure or the degree of the similarity itself exceeds a threshold. The threshold may be set higher or lower to suit the application. For example, if the synchronization pattern is relatively complex (e.g., adjacent pixels with very different pixel values) among possible patterns, then a respective threshold might be set relatively low because of the relative ease in matching a complex portion of media content. On the other hand, where the identification involves a less complex synchronization pattern, then a higher confidence threshold might be more appropriate. In addition, corresponding portions that are identified can have their media content and relative confidences compared across the group of encoders. In the case where a less complex synchronization pattern is provided, if several encoders identify the same media content, but each individually without a high degree of confidence, that media content may still be deemed a match due to the uniformity of the identifications across the group of encoders.

After an encoder identifies a corresponding portion of the live media stream, the encoder identifies a timestamp associated with the portion of the live media (312). In some implementations, the timestamp represents when the encoder received the corresponding portion of live media stream. In other implementations, the timestamp corresponds to that encoder's offset compared to the source time of when the portion was received (e.g., a 100 millisecond offset). After identifying a timestamp, each encoder of an encoder group sends a timestamp to the encoder that provided the synchronization pattern (314). Depending on the size of an encoder group, the requesting encoder receives a single timestamp, but in other implementations the encoder receives several timestamps from several encoders.

Upon receiving a timestamp from a responding encoder, a requesting encoder determines an offset (316). In some implementations, the offset is a time difference between the second timestamp and the first timestamp, which represents the amount of time between when one encoder received a feed of live content compared to when another encoder received a different feed of the live content. After determining the offset, the encoder creates fragments based on the offset (318). For example, if one encoder has an offset of 100 milliseconds and another encoder has an offset of 200 milliseconds, then the first encoder will encode a fragment starting 100 milliseconds after the source time and the second encoder will encode a fragment starting 200 milliseconds after the source time, but both fragments will span the same segment of media content. In this way, after using the offset to create a first fragment, subsequent fragments that are encoded remain aligned according to the fixed duration of that each of the encoders the fragments.

In some implementations, a client device is provided fragments encoded by different encoders. In some cases, different encoders are used as part of a load balancing scheme to provide fragments from multiple encoders. A variety of load balancing techniques may be used to balance encoding processes. In one implementation, a round-robin selection process automatically distributes incoming encoding requests according to the next and/or available encoder. For example, a request for a first set of fragments may be received and routed to a first encoder. When a subsequent request for a second set of fragments is received, the request is routed to a different encoder. In another implementation, a load balancer component analyzes computing resources (e.g., remaining encoding capacity, number of encoding processes, complexity of encoding processes, etc.) of the encoders in order to distribute or balance encoding processes. For example, a load balancer component analyzes computing resources from four encoders encoding a live basketball game. At one point, the load balancer component determines that each encoder is responsible for 25% of the total encoding load of the live basketball game. Later, one of the encoders begins an additional encoding process for a live cooking show. As a result, the load balancer component determines that encoding loads for the live basketball game should be redistributed among the encoders to account for the additional encoding process (e.g., three of the encoders are responsible for 30% of the total encoding load and the remaining encoder is responsible for 10% of the encoding load). In other situations, additional encoders are added and/or removed from a group of encoders depending on the complexity of the media content (more complex media content requires more computing resources to encode the media content). For example, a load balancer component might allocate more encoders to encode a live basketball game because of the complexity of the media content (e.g., greater number of pixel changes between frames because of the movement occurring in the game). In contrast to the basketball game, a cartoon with a solid color background is typically less complex, and as such, a load balancer component would allocate fewer encoders to encode fragments. In some implementations, the transition from fragments provided from different encoders is facilitated by fragments created with deterministic names, (e.g., . . . /frame_time/fragment_length/}, which are uniform across all the encoders in an encoding group.

In other implementations, fragments are provided by different encoders after one encoder becomes unreliable. For example, if an encoder's encoding performance diminishes such that it cannot continue encoding fragments quickly enough, an edge server determines that the encoder has become unreliable and requests fragments from a different encoder. Different performance characteristics of the encoders can be used to balance and/or determine reliability of a total encoding load. The performance characteristics include rebuffer rates (i.e., when playback of media content is interrupted because an encoder is not providing fragments reliably), playback error rates (e.g., fatal errors interrupting or terminating playback of the media content), bitrates of fragments requested by client devices (e.g., the average, median, etc. of bitrates being requested), current number of connections (i.e., the number of client devices requesting fragments for playback of media content), available capacity of the encoder, and other metrics that can affect playback of the media content. In addition, an encoder might also be determined to be unreliable when a threshold number or percentage of the client devices report errors. For example, reliability of an encoder might be determined in response to a single error message from a client device, multiple errors within a certain time period, an error rate, etc. The manner in which the determination is triggered within any given implementation may vary based on the nature and/or severity of the error or the combination of errors. In another example, an encoder might be determined to be unreliable only where a complete failure has been detected, e.g., responses are not received to requests for fragments, server components are reported as down, etc. Further variations will be apparent to those of skill in the art.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A system, comprising one or more processors and memory configured to:
   receive a request to encode media content;
   generate, by a first encoder, a plurality of fingerprints corresponding to a portion of the media content, the portion of the media content being associated with a first timestamp;
   generate, by the first encoder, a synchronization pattern based on the fingerprints;
   provide the synchronization pattern to a second encoder;
   receive a second timestamp associated with the portion of the media content from a second encoder;
   determine, by the first encoder, a first offset based on the first timestamp and the second timestamp;
   encode, by the first encoder, a fragment corresponding to a segment the media content using the first offset;
   generate, by the first encoder, a new synchronization pattern based on additional fingerprints associated with a third timestamp;
   provide the new synchronization pattern to the second encoder;
   receive a fourth timestamp from the second encoder;
   determine, by the first encoder, a second offset based on the third timestamp and the fourth timestamp;
   determine, by the first encoder, that the second offset is different from the first offset; and
   encode, by the first encoder, an additional fragment using the second offset.

2. The system of claim 1, wherein the one or more processors and memory are configured to generate the fingerprints by determining a pixel intensity value associated with a block of pixels, the pixel intensity value being an average value of each pixel of the block of pixels.

3. The system of claim 1, wherein the first timestamp represents when the first encoder received the portion of the media content, and wherein the second timestamp represents when the second encoder received a corresponding portion of the media content.

4. The system of claim 1, wherein the one or more processors and memory are configured to:
   receive a first request from a client device for playback of the media content;
   provide first fragments encoded by the first encoder to the client device
   receive a second request from the client device for playback of the media content; and
   provide second fragments encoded by the second encoder to the client device.

5. The system of claim 4, wherein the one or more processors and memory are configured to:
   determine that the first encoder is not reliably encoding fragments for the media content; and
   responsive to determining that the first encoder is not reliably encoding fragments for the media content, request the second fragments encoded by the second encoder.

6. The system of claim 4, wherein the one or more processors and memory are configured to provide the first fragments and provide the second fragments according to a load balancing scheme.

7. The system of claim 1, wherein the one or more processors and memory are configured to determine the first offset based on the first timestamp and the second timestamp by identifying a time difference between that the first timestamp and the second timestamp.

8. A method, comprising:
   receiving a request to encode media content;

generating, by a first encoder, a plurality of fingerprints corresponding to a portion of the media content, the portion of the media content being associated with a first timestamp;

generating, by the first encoder, a synchronization pattern based on the fingerprints;

providing the synchronization pattern to a second encoder;

receiving a second timestamp associated with the portion of the media content from a second encoder;

determining, by the first encoder, a first offset based on the first timestamp and the second timestamp;

encoding, by the first encoder, a fragment corresponding to a segment the media content using the first offset;

generating, by the first encoder, a new synchronization pattern based on additional fingerprints associated with a third timestamp;

providing the new synchronization pattern to the second encoder;

receiving a fourth timestamp from the second encoder;

determining, by the first encoder, a second offset based on the third timestamp and the fourth timestamp;

determining, by the first encoder, that the second offset is different from the first offset; and encoding, by the first encoder, an additional fragment using the second offset.

9. The method of claim 8, further comprising generating the fingerprints by determining a pixel intensity value associated with a block of pixels, the pixel intensity value being an average value of each pixel of the block of pixels.

10. The method of claim 8, wherein the first timestamp represents when the first encoder received the portion of the media content, and wherein the second timestamp represents when the second encoder received a corresponding portion of the media content.

11. The method of claim 8, further comprising:
receiving a first request from a client device for playback of the media content;
providing first fragments encoded by the first encoder to the client device
receiving a second request from the client device for playback of the media content; and
providing second fragments encoded by the second encoder to the client device.

12. The method of claim 11, further comprising determining that the first encoder is not reliably encoding fragments for the media content, and responsive to determining that the first encoder is not reliably encoding fragments for the media content, requesting the second fragments encoded by the second encoder.

13. The method of claim 11, wherein providing the first fragments and providing the second fragments is done in accordance with a load balancing scheme.

14. The method of claim 8, further comprising determining the first offset based on the first timestamp and the second timestamp by identifying a time difference between that the first timestamp and the second timestamp.

15. A computer program product, comprising one or more non-transitory computer-readable media having computer program instructions stored therein, the computer program instructions being configured such that, when executed by one or more computing devices, the computer program instructions cause the one or more computing devices to:
receive a request to encode media content;
generate, by a first encoder, a plurality of fingerprints corresponding to a portion of the media content, the portion of the media content being associated with a first timestamp;

generate, by the first encoder, a synchronization pattern based on the fingerprints;

provide the synchronization pattern to a second encoder;

receive a second timestamp associated with the portion of the media content from a second encoder;

determine, by the first encoder, a first offset based on the first timestamp and the second timestamp;

encode, by the first encoder, a fragment corresponding to a segment the media content using the first offset;

generate, by the first encoder, a new synchronization pattern based on additional fingerprints associated with a third timestamp;

provide the new synchronization pattern to the second encoder;

receive a fourth timestamp from the second encoder;

determine, by the first encoder, a second offset based on the third timestamp and the fourth timestamp;

determine, by the first encoder, that the second offset is different from the first offset; and encode, by the first encoder, an additional fragment using the second offset.

16. The computer program product of claim 15, wherein the computer program instructions are configured to cause the one or more computing devices to generate the fingerprints by determining a pixel intensity value associated with a block of pixels, the pixel intensity value being an average value of each pixel of the block of pixels.

17. The computer program product of claim 15, wherein the first timestamp represents when the first encoder received the portion of the media content, and wherein the second timestamp represents when the second encoder received a corresponding portion of the media content.

18. The computer program product of claim 15, wherein the computer program instructions are further configured to cause the one or more computing devices to:
receive a first request from a client device for playback of the media content;
provide first fragments encoded by the first encoder to the client device
receive a second request from the client device for playback of the media content; and
provide second fragments encoded by the second encoder to the client device.

19. The computer program product of claim 18, wherein the computer program instructions are further configured to cause the one or more computing devices to:
determine that the first encoder is not reliably encoding fragments for the media content; and
responsive to determining that the first encoder is not reliably encoding fragments for the media content, request the second fragments encoded by the second encoder.

20. The computer program product of claim 18, wherein the computer program instructions are configured to cause the one or more computing devices to provide the first fragments and provide the second fragments according to a load balancing scheme.

21. The computer program product of claim 15, wherein the computer program instructions are configured to cause the one or more computing devices to determine the first offset based on the first timestamp and the second timestamp by identifying a time difference between that the first timestamp and the second timestamp.

\* \* \* \* \*